Figure 1:
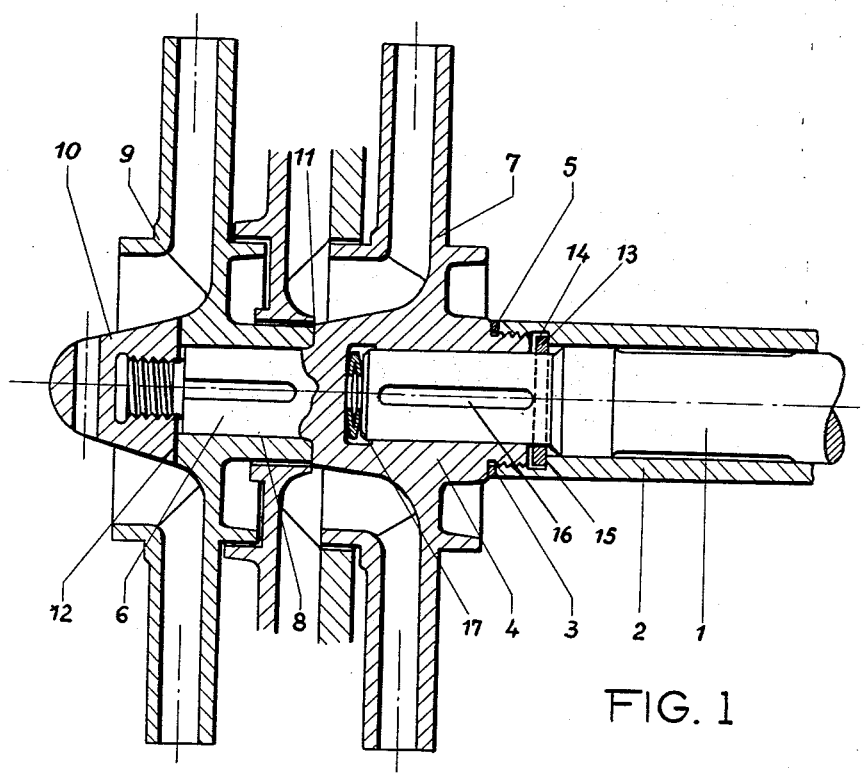

Nov. 22, 1960  W. BUSCHHORN ET AL  2,960,939
ROTOR ATTACHMENT FOR CENTRIFUGAL PUMPS
Filed March 10, 1958

INVENTORS
WALTHER BUSCHHORN
RUDOLF SCHAFFER

BY Paul M. Craig, Jr.
ATTORNEY 2,960,939
Patented Nov. 22, 1960

2,960,939
ROTOR ATTACHMENT FOR CENTRIFUGAL PUMPS

Walther Buschhorn, Pegnitz, Oberfranken, and Rudolf Schaffer, Nurnberg, Germany, assignors to Firm Amag-Hilpert-Pegnitzhütte A.G., Nurnberg, Germany Filed Mar. 10, 1958, Ser. No. 720,444

9 Claims. (Cl. 103—111)

The invention relates to a rotor attachment for centrifugal pumps, in which the rotor is connected with a shaft protecting sleeve, so that it is fluid-proof and detachable, and the hub of the rotor is of closed construction on the suction side.

In the known rotor attachments of this type the shaft protecting sleeve is produced in one piece with the hub of the rotor and connected with the shaft positively or in form-locking manner by suitable means. This attachment is, as a rule only possible in the case of pumps with low capacity, because the transmission of the torque from the shaft to the rotor cannot be effected with fitting keys. Moreover, the production of the rotor and shaft protecting sleeve in one piece entails considerable expense.

Furthermore, in the known rotor attachments the rotor is screwed directly on the shaft end provided with a screw thread. This attachment is likewise only suitable for small capacity pumps, because in the event of the pump rotating in the wrong direction, the rotor can become detached from the shaft. Moreover, exact alignment of the rotor and shaft present manufacturing difficulties in the case of this type of attachment.

Rotor attachments are also known, particularly in connection with multiple stage rotary pumps, in which the axial pressure is transmitted from the rotor to the shaft by means of a two-part ring let into a groove in the shaft. The reliable operation of this attachment is dependent upon a good fit of the ring in the groove cut in the shaft. This, because the supporting ring must take up the axial forces in both directions.

While avoiding the objections inherent to the known rotor attachments, an attachment is proposed according to the invention which is characterized particularly in that, taking into consideration the axial thrust which occurs, the rotor is given a firm seat on the shaft to a great extent independent of tolerances in manufacture of the means participating in the attachment of the rotor.

This is attained according to the invention in that the rotor is fixed in axial direction on a ring inserted between the hub of the rotor and the shaft protecting sleeve in a recess cut in the latter or in the shaft itself, so that the ring is supported on the one hand against the shaft protecting sleeve and on the other hand against the fitting keys arranged in the shaft or, if let into a groove in the shaft itself, against the annular surface of the shaft groove on the suction side by means of a spring introduced between the bottom of the hub bore and the end face of the shaft end. It is particularly advantageous for the ring to be supported directly against the fitting keys arranged in the shaft because in this case a ring made in one piece can be employed without it being necessary to provide the shaft with a groove for receiving the ring, which groove reduces the strength of the shaft.

In another form of construction according to the invention and intended for two-stage rotary pumps, the hub, which is of closed construction on the suction side, is provided with an extension in the form of a shaft end which constitutes the seat for the second runner wheel or rotor. This construction presents the particular advantage that the same shaft can be employed both for a single stage and also for a two-stage rotary pump. So that, in the case of the two-stage construction, the same rotors can be used as in the single stage construction, the extended rotor hub, forming the seat for the second rotor, is preferably given the same dimensions as the seating surface for the rotor on the pump shaft.

Figure 2:
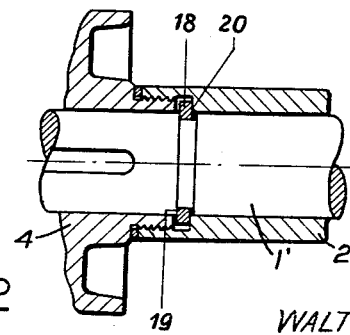

Two embodiments of the invention are illustrated by way of example in the accompany drawing, in which Fig. 1 is an axial section through a rotor attachment means for a two-stage centrifugal pump, and Fig. 2 shows a modified construction of rotar attachment with supporting ring let into a groove.

In Fig. 1 a shaft 1, mounted in a manner not shown on the drawing, is provided with a shaft protecting sleeve 2, the end of which is connected with the hub 4 of the rotor 7 of the second stage, a packing 5 being interposed between the end face 3 and the hub 4. To connect sleeve 2 to the hub 4, an internally threaded end portion of the sleeve is screwed onto an externally threaded portion of the hub, the packing 5 being compressed thereby to provide a liquid-tight seal between the end face 3 and the hub 4. An extension 6 in the form of a shaft end on the suction side of the rotor 7 of the second stage, is constructed as seating surface 8 for the rotor 9 of the first stage. The rotor 9 is pressed in axial direction against the collar 11 of the rotor 7 by means of a nut 10 threaded on an end portion of the shaft extension 6. This nut 10 is secured against working loose by a lockwasher 12. The rotor 7 of the second stage is supported in axial direction by means of a ring 13 let into a recess 14 between the rotor hub and the shaft protecting sleeve and is pressed in the direction of the suction side by a spring arrangement 17 in such a manner that the ring bears on the one hand against the shoulder 15 of the shaft protecting sleeve and on the other hand against an end shoulder of a fitting key 16 secured against axial movement in the pump shaft.

According to Fig. 2, a two-part ring 18 is placed in an annular groove in the pump shaft 1' in such a manner that, under the action of a spring arrangement, similar to that of spring 17 in Figure 1, introduced between the rotor hub and the pump shaft, the ring 18 bears on one side against the annular shoulder surface 19 on the suction side of the shaft groove and on the other side against the annular shoulder surface 20 of the shaft protecting sleeve.

In the illustrated embodiments of the invention, in each case the pump impeller is keyed to the pump shaft so that it cannot be loosened by reverse rotation of the impeller, and the axial position of the impeller relative the shaft is determined by the abutment surfaces on the shaft and the protective sleeve, respectively, which are held in abutment against opposite sides of blocking means such as the rings 13 or 18 by the compressive force of spring 17 acting between the end of the shaft and the end of the shaft receiving bore in the hub 4.

We claim:

1. A mounting arrangement of an impeller of a rotary pump comprising a rotary shaft, a pump impeller keyed to said shaft, a protective shaft sleeve surrounding said shaft, means on said impeller and said sleeve for releasably securing them with a fluid-tight seal therebetween, said impeller having a bore closed at one end and within which the end of said shaft is received, an abutment surface within said protective shaft sleeve facing toward the end of the shaft, means on said shaft defining another abutment surface facing in an axial direction away from the end of the shaft, blocking means arranged between said two abutment surfaces to block relative axial movement thereof in one direction, and spring means arranged between the impeller and the shaft pressing said abutment surfaces against the blocking means.

2. A mounting arrangement according to claim 1, including fitting key means on said shaft, the end of said key means providing the abutment surface at the shaft.

3. A mounting arrangement according to claim 1, wherein the abutment surface at the shaft is formed by one wall of an annular groove in the shaft, the blocking means extending into said groove.

4. A mounting arrangement according to claim 1, wherein said blocking means is a ring encircling said shaft.

5. A rotor assembly for centrifugal pumps comprising a shaft, a shaft protecting sleeve, a rotor keyed to said shaft and connected in form-locking manner with the shaft protecting sleeve but being detachable therefrom, said rotor having a bore open at one end to receive said shaft and closed at the other end, each of said shaft and said sleeve being provided with shoulder means facing in opposite directions respectively, blocking means between said shoulders fixing said rotor against axial displacement in one direction on said shaft, and a spring between the closed end of said bore and an end face of said shaft, said spring being held in compression by the form-locking connection between said rotor and said sleeve and holding said shoulders against said blocking means.

6. A rotor assembly according to claim 5, wherein said sleeve is threaded on said rotor and the shoulder on said shaft is formed by a key secured thereto against axial movement in one direction.

7. A rotor assembly according to claim 5, wherein said sleeve is threaded on said rotor and the shoulder on said shaft is formed by a wall of a groove in said shaft.

8. A rotor assembly as set forth in claim 5, wherein said rotor includes a hub closed at the suction side thereof opposite said shaft and is provided on said side with a coaxial extension in the form of a shaft end constituting the seat for a second rotor, and a second rotor keyed to said extension.

9. A rotor assembly as set forth in claim 8, wherein said extension is of the same diameter as the end of the shaft received in said rotor bore.

References Cited in the file of this patent

UNITED STATES PATENTS

| | | |
|---|---|---|
| 1,850,683 | Merrill | Mar. 22, 1932 |
| 2,708,126 | McLachlan et al. | May 10, 1955 |
| 2,793,869 | Braun | May 28, 1957 |
| 2,811,339 | Osborne et al. | Oct. 29, 1957 |

FOREIGN PATENTS

| | | |
|---|---|---|
| 544,674 | Great Britain | Apr. 23, 1942 |